Figure 1:
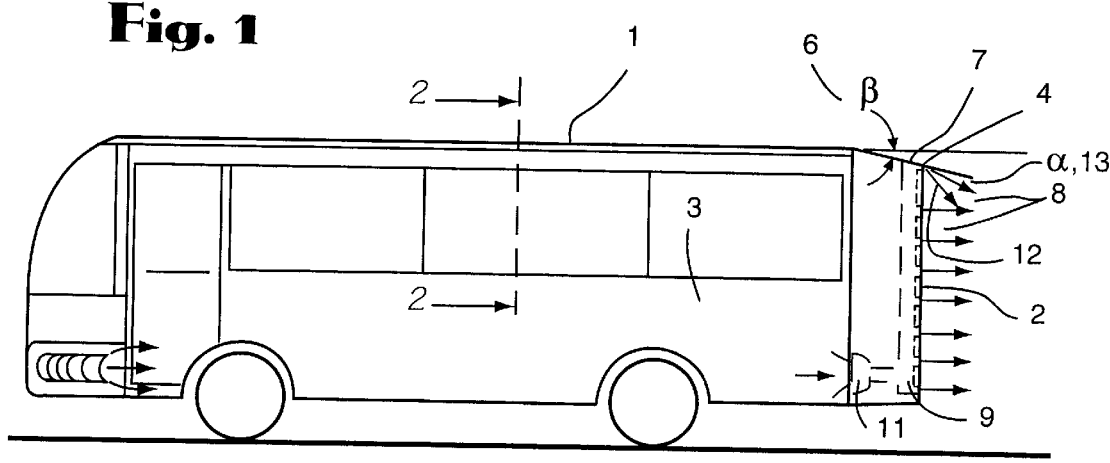

United States Patent

Lechner

[11] Patent Number: 5,842,734
[45] Date of Patent: Dec. 1, 1998

[54] DEVICE FOR REDUCING THE AERODYNAMIC RESISTANCE OF A VEHICLE PREFERABLY A UTILITY VEHICLE

[76] Inventor: Anton Lechner, Eichenweg 6, 85774 Unterföhring, Germany

[21] Appl. No.: 788,094

[22] Filed: Jan. 23, 1997

[30] Foreign Application Priority Data

Jan. 25, 1996 [DE] Germany ............ 196 02 602.4

[51] Int. Cl.$^6$ .................................................. B62D 35/00
[52] U.S. Cl. ............................. 296/180.1; 246/180.4; 246/91
[58] Field of Search .............. 296/180.1, 180.4, 296/91

[56] References Cited

U.S. PATENT DOCUMENTS

| | | | |
|---|---|---|---|
| 2,242,494 | 5/1941 | Wolf | 2196/91 |
| 3,807,787 | 4/1974 | Gotz | 296/91 |
| 3,910,623 | 10/1975 | McKeen | 296/180.1 |
| 4,142,755 | 3/1979 | Keedy . | |
| 4,214,787 | 7/1980 | Chain . | |
| 4,320,920 | 3/1982 | Goudey | 296/180.1 |
| 4,460,055 | 7/1984 | Steiner | 296/180.1 |
| 4,601,508 | 7/1986 | Kerian . | |
| 4,838,603 | 6/1989 | Masoero et al. | 296/780.1 |
| 5,094,503 | 3/1992 | Dare-Bryan | 296/180.1 |
| 5,171,057 | 12/1992 | Sharp | 296/180.4 |
| 5,375,903 | 12/1994 | Lechner . | |

FOREIGN PATENT DOCUMENTS

| | | | |
|---|---|---|---|
| 2613682 | 10/1988 | France | 296/180.1 |
| 20 06 250 | 9/1971 | Germany . | |
| 221800 | 4/1980 | Germany | 296/180.1 |
| 31 09 380 | 3/1981 | Germany . | |
| 3115742 | 11/1982 | Germany | 296/180.4 |
| 38 37 729 | 5/1990 | Germany . | |
| 152618 | 9/1983 | Japan | 296/180.1 |

OTHER PUBLICATIONS

Peller et al; Experimental Untersuchungen zur Verminderung des heckwiderstandes and Lastkraftwagen, ATZ Automobiltechnische Zeitschrift 87 (1985) 6, p. 299.

*Primary Examiner*—Gary C. Hoge
*Attorney, Agent, or Firm*—Nixon & Vanderhye P.C.

[57] ABSTRACT

In a vehicle, especially a utility vehicle, aerodynamically acting device for reducing the aerodynamic resistance are provided at the corners between the side panel and roof and at the corners between the side panel and rear end. The flow around the edge between the side wall and roof, especially under side wind conditions, is optimized by means of a bent roof surface (7). At the rear end, the side panel and the roof surface are also bent (7) in a form that tapers the flow around them. For further resistance reduction, blowout openings (8) are provided on the edges of the rear end, by way of which openings either back pressure air from the relative wind or pressurized air from the fan is blown out obliquely to the center axis of the vehicle, so that the static pressure of the rear-end surface is relatively increased and the aerodynamic resistance is reduced thereby.

6 Claims, 2 Drawing Sheets

DEVICE FOR REDUCING THE AERODYNAMIC RESISTANCE OF A VEHICLE PREFERABLY A UTILITY VEHICLE

PRIOR ART

Utility vehicles such as trucks, trailers or buses, typically have a stubby and practically rectangular rear end or tail. The relative wind detaches at the outer edge of this kind of rear end and causes a large eddy field or wake behind the rear end, which makes up a considerable portion of the total resistance of the vehicle and is known as the tail resistance.

In order to reduce this aerodynamic resistance, rigid or inflatable devices have been proposed previously (for instance, German Published, Unexamined Patent Application DE- OS 31 15 742, U.S. Pat. No. 4,142,755, U.S. Pat. No. 4,601,508), which reduce the flow separation cross section at the rear end and can be secured as an accessory to the rear end of the vehicle. These devices increase the total length of the vehicles, and hence legal regulations stand in the way of their use.

Devices (U.S. Pat. No. 4,214,787, for instance) are also known in which air guide faces are folded open manually or pneumatically. It is disadvantageous, however, that they are secured to the existing vehicles and hence again lengthen the original vehicle length somewhat, are vulnerable to damage because they protrude from the actual outline of the vehicle, and impair the appearance of the vehicles, as in buses. For the bus, design and an attractive appearance are of major significance. The devices proposed previously are not integrated into the vehicle and spoil the overall appearance, so that some other remedy is desired.

Because of the influence of wind, vehicles as they travel generally experience an oblique oncoming flow. Hence there is a flow around the long edges of the vehicle on the roof. If these edges are relatively sharp and right-angled, as is typical for truck trailers, for instance, then the flow separates at these edges and causes not-inconsiderable aerodynamic resistance and lateral force.

This is why buses, for instance, have rounded corners. Technically, however, rounded corners are relatively complicated and expensive to produce. It is also known that the flow can separate in an undefined and oscillating way at round surfaces, thus preventing a more-favorable so-called Bernoullian pressure buildup.

Special corner contours have been proposed for instance in German Patent Disclosure 2218300, but their embodiments are again complicated and expensive to produce and protrude beyond the actual vehicle outline, so that once again improvements are needed.

U.S. Pat. No. 5,094,503 discloses embodiments of the roof surface of trucks in which only the roof surface drops downward toward the rear end in a certain internal region, while clearly the contour continues to have a straight course. These lateral beads, with a straight- ahead flow effect an advantageous eddy development but present a certain aerodynamic resistance to any side wind. This embodiment is therefore not advantageous under generally prevailing driving and wind conditions.

To increase the static pressure in the rear end region, devices are also known (German Patent Disclosures 31 15 742 and 38 37 729), in which air is blown out at the rear end. However, then the air is either blown out at a tangent to the tapering contour or parallel to the longitudinal axis of the vehicle in order to supply energy to the boundary layer of the flow and in order to prevent a premature, undesirable flow separation at the retracted vehicle contour (so-called boat-tailing). Yet this method is effective only with retracted rear-end contours, such as an in a passenger car. Utility vehicles, however, have a boxlike contour, without or with only a slight retraction or rounding at the rear end.

INVENTIVE ATTAINMENT OF THE OBJECT

Figure 2:
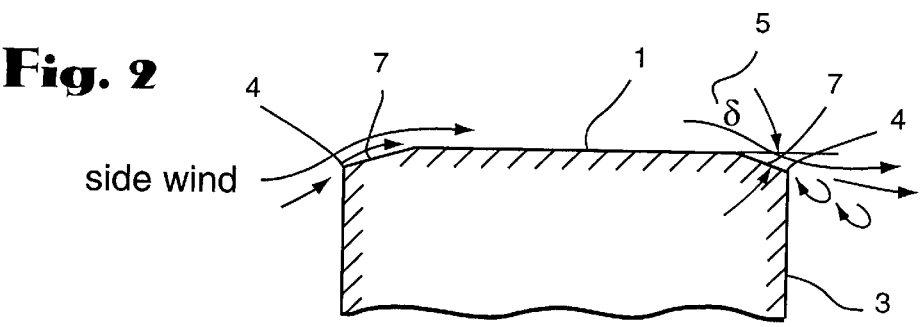
Figure 3:
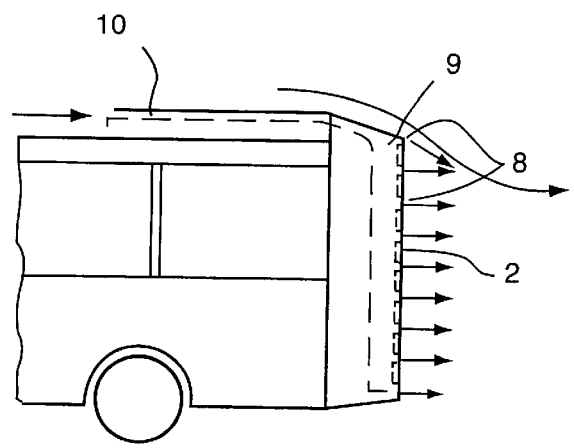
Figure 4:
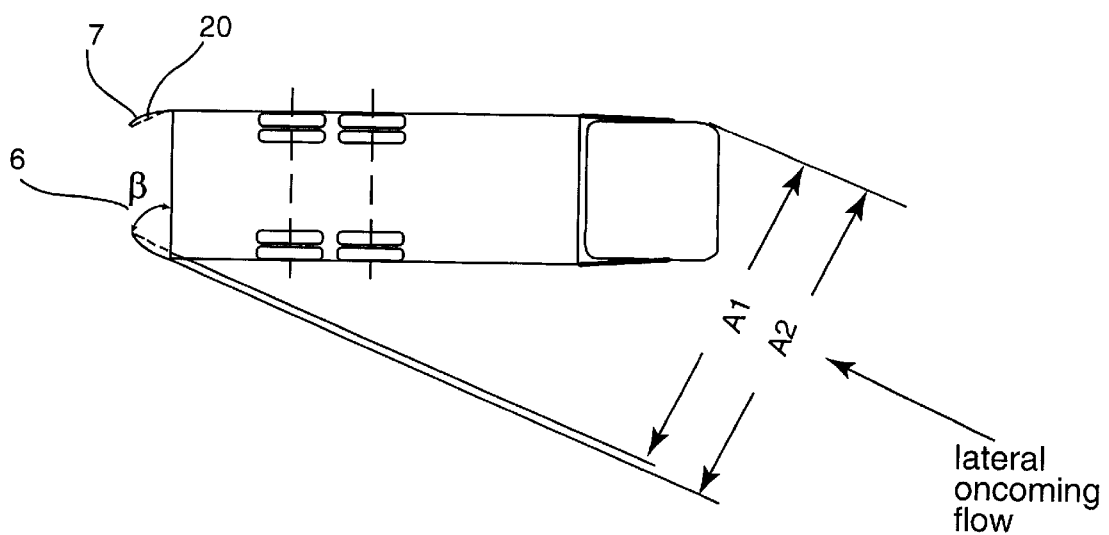

These disadvantages are overcome according to the invention by the following devices:

In order to reduce the aerodynamic resistance on the side panels and on the rear end (FIGS. 1, 2, 3), the longitudinal roof edges (1) and the corners of the rear end (2) are not rounded; instead, the roof and/or side panels are bent to form spoiler surfaces having a defined angle range β (6) of between 10° and 20° at the rear end and δ (5) by between 10° and 20° on the roof. If the bend angle is selected to be overly great, the flow separates. It is advantageous that flat surfaces are easier to manufacture than rounded ones. By means of the angled spoiler zone (7), because of what is known as the Coanda effect, the flow around the contour can proceed without separating, and a defined separation edge (4) is created at the roof on the lee side, in contrast to the rounded edge. Toward the rear-end side, a greater retraction of the flow cross section, relative to the length of the retraction, is attainable than if there were a rounded or parabolic transition. Moreover, as FIG. 4 shows, under side wind conditions with the shape of the contour bend (7), the aerodynamic resistance area A1 projected in the oncoming flow direction (that is, the cross-sectional area of the vehicle placed laterally of the incoming flow angle) is less than the aerodynamic resistance area A2 in the case of a rounded or parabolic rear apron (20), so that by this means as well, the aerodynamic resistance and the lateral force can be reduced.

The tail resistance can also be considerably reduced if air outflow nozzles (8) are disposed on the outer edge of the rear end (2), by way of which nozzles air is blown out toward the outer contour at a certain angle α (13), such that in a practical sense the outer jacket of the stream of blown-out air retracts the contours and causes the flow around the vehicle to taper. The air required for this can be carried for instance via an air inlet (10) (FIGS. 1, 3) located on the roof into an annular conduit (9) of the rear end, or else in the case of a bus, for instance, the exhaust from the air conditioner fans or the motor fan is used. In the latter case it is also advantageous that the otherwise unused cooling capacity is partly recovered as a flow pulse (thrust) of the outflow nozzles. It is also conceivable to provide a separate fan (11) the fan capacity to be brought to bear is considerably less than the capacity recovered from the thrust of the nozzles and the considerable pressure recovery at the rear-end surface. The fan can be switched, for instance via a switch linked with the speedometer, such that it turns on only beyond a preselectable speed.

The combination of a bent rear contour, of the kind proposed previously, and blowing out air at the rear as proposed here is very effective. In the case of a bus, for instance, thus can be integrated without effort or expense into the usual plastic form of the rear apron.

The proposed embodiment of blown-out air at the rear end is not merely limited to utility vehicles; it can also be used advantageously for passenger cars in the form of station wagons or campers, for instance. Station wagons typically have a large tailgate. A blower could be built into the tailgate and the air blown out via the gaps in the doors, making separate outflow nozzles unnecessary. The airstream angle can easily be adjusted by means of the shape of the door gap.

It may also be advantageous from some nozzles, for instance on the roof side, to direct the air downward (12) over the rear window to prevent its being soiled by the tail eddy.

I claim:

1. A device for reducing the aerodynamic resistance of a forwardly moving utility vehicle body, said device comprising:

an angled spoiler zone adapted for positioning at a rear end of the vehicle body, said angled spoiler zone having, (i) a downwardly sloping upper planar spoiler surface extendible rearwardly from an upper horizontal side wall of the vehicle body;

(ii) a pair of inwardly sloping planar side spoiler surfaces each of which is extendible rearwardly from a respective one of a vertical side wall of the vehicle body, wherein (iii) each of said upper and side spoiler surfaces forms an angle $\beta$ of between 10° to 20° relative to the upper and side walls, respectively, of the vehicle body, and wherein (iv) said angled spoiler zone creates a Coanda effect during forward vehicle body movement to cause primary aerodynamic flow of air to follow closely said angled spoiler zone as the primary air flow moves in a rearward direction from the upper and side walls toward the rear end of the vehicle; and wherein said device also includes a series of nozzles positioned relative to said upper and side spoiler surfaces so as to direct respective streams of secondary air flow at an angle $\alpha$ relative to said upper and side spoiler surfaces, wherein said angle $\alpha$ causes said primary air flow to be further deflected inwardly at the rear end of the vehicle body, whereby aerodynamic resistance of the vehicle body during forward vehicle movement is reduced.

2. The device of claim 1, further comprising a conduit connected to each of said nozzles for directing said secondary air flow thereto.

3. The device of claim 2, further comprising a fan operatively associated with said conduit for creating said secondary air flow.

4. The device of claim 2, wherein said conduit has an air inlet to which allows air to enter during forward movement of said vehicle so as to create said secondary air flow.

5. The device of claim 1, which further comprises lateral spoiler surfaces adapted to join the side walls to the upper wall of the vehicle body, wherein said lateral spoiler surfaces form an angle $\delta$ of between 10° and 20° relative to said upper wall.

6. The device of claim 1, wherein said upper and side spoiler surfaces extend rearwardly of a rear wall of the vehicle body.

* * * * *